United States Patent
Monti

(10) Patent No.: US 8,530,764 B2
(45) Date of Patent: Sep. 10, 2013

(54) DEVICE FOR WEIGHING ARTICLES MOVING CONTINUOUSLY ALONG A CONVEYING LINE

(75) Inventor: Giuseppe Monti, Pianoro (IT)

(73) Assignee: Neri S.p.A., Barberino di Mugello (Firenze) (IT)

( * ) Notice: Subject to any disclaimer, the term of this patent is extended or adjusted under 35 U.S.C. 154(b) by 466 days.

(21) Appl. No.: 12/942,117

(22) Filed: Nov. 9, 2010

(65) Prior Publication Data

US 2011/0108331 A1    May 12, 2011

(30) Foreign Application Priority Data

Nov. 10, 2009   (IT) .................. BO2009A0735

(51) Int. Cl.
*G01G 19/00*   (2006.01)

(52) U.S. Cl.
USPC .......................................... 177/145

(58) Field of Classification Search
USPC .......................................... 177/145
See application file for complete search history.

(56) References Cited

U.S. PATENT DOCUMENTS

| | | | |
|---|---|---|---|
| 5,007,561 A | 4/1991 | Wahl et al. | |
| 5,086,855 A * | 2/1992 | Tolson | 177/5 |
| 5,137,099 A | 8/1992 | Tolson | |
| 5,236,337 A * | 8/1993 | Kikuchi et al. | 177/52 |
| 5,326,938 A * | 7/1994 | Tolson | 177/5 |
| RE34,839 E * | 1/1995 | Tolson | 177/5 |
| 5,584,249 A | 12/1996 | Vandeberg | |
| 6,630,633 B1 | 10/2003 | Uber et al. | |
| 7,408,124 B2 | 8/2008 | Fochler | |
| 7,956,296 B2 * | 6/2011 | Hodgson et al. | 177/145 |
| 2010/0200306 A1 * | 8/2010 | Trebbi | 177/1 |

* cited by examiner

*Primary Examiner* — Randy W Gibson
(74) *Attorney, Agent, or Firm* — William J. Sapone; Ware Freesola; Maguire & Barber LLP

(57) ABSTRACT

A device for continuously weighing articles in arrival from a conveyor organ, of a type comprising: a weighing device (40) arranged downstream of the conveyor organ (80), which weighing device (40) is able to detect a weight of articles transiting continuously thereon, a first conveyor (20) for abutting and engaging a side of an article (X) in arrival from the conveyor organ (80), which first conveyor (20) transfers the article (X) towards the weighing device (40); a second conveyor (30) associated to the weighing device (40) and arranged for receiving the article (X) while the article (X) is engaged to and drawn by the first conveyor (20) and being activatable so as to be able to convey the article (X) at a second advancement velocity (V2) which is greater than the first advancement velocity (V1), so as to disengage the article (X) from the action of the first conveyor (20) and to advance the article (X) freely onto the weighing device (40) in order to detect a relative weight thereof and convey the article (X) downstream of the weighing device (40).

9 Claims, 4 Drawing Sheets

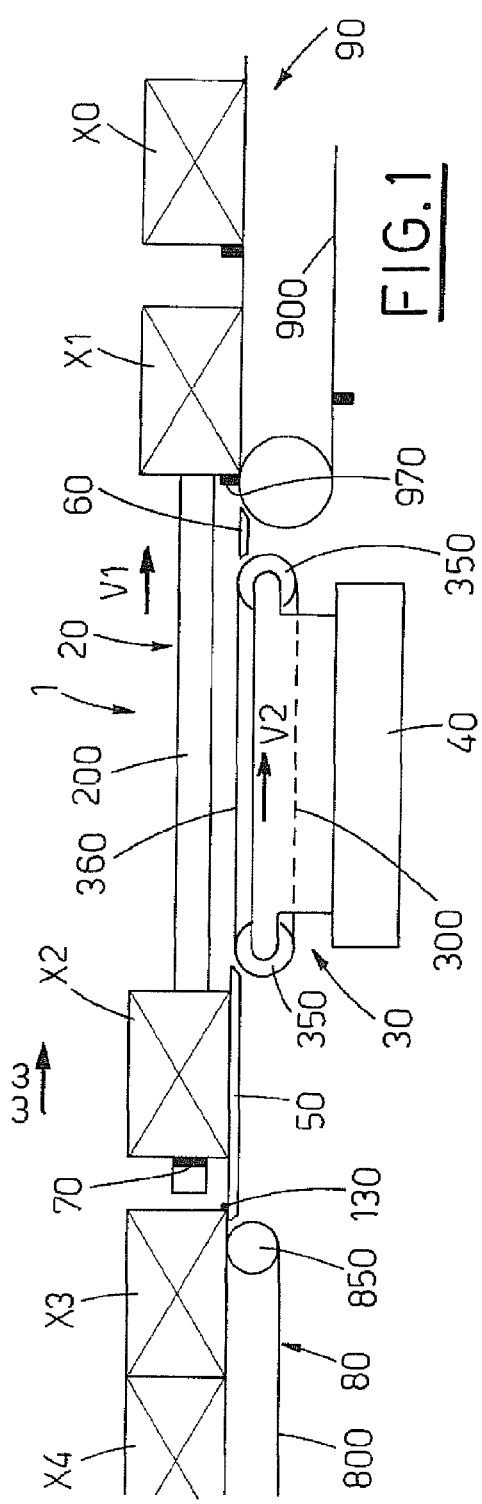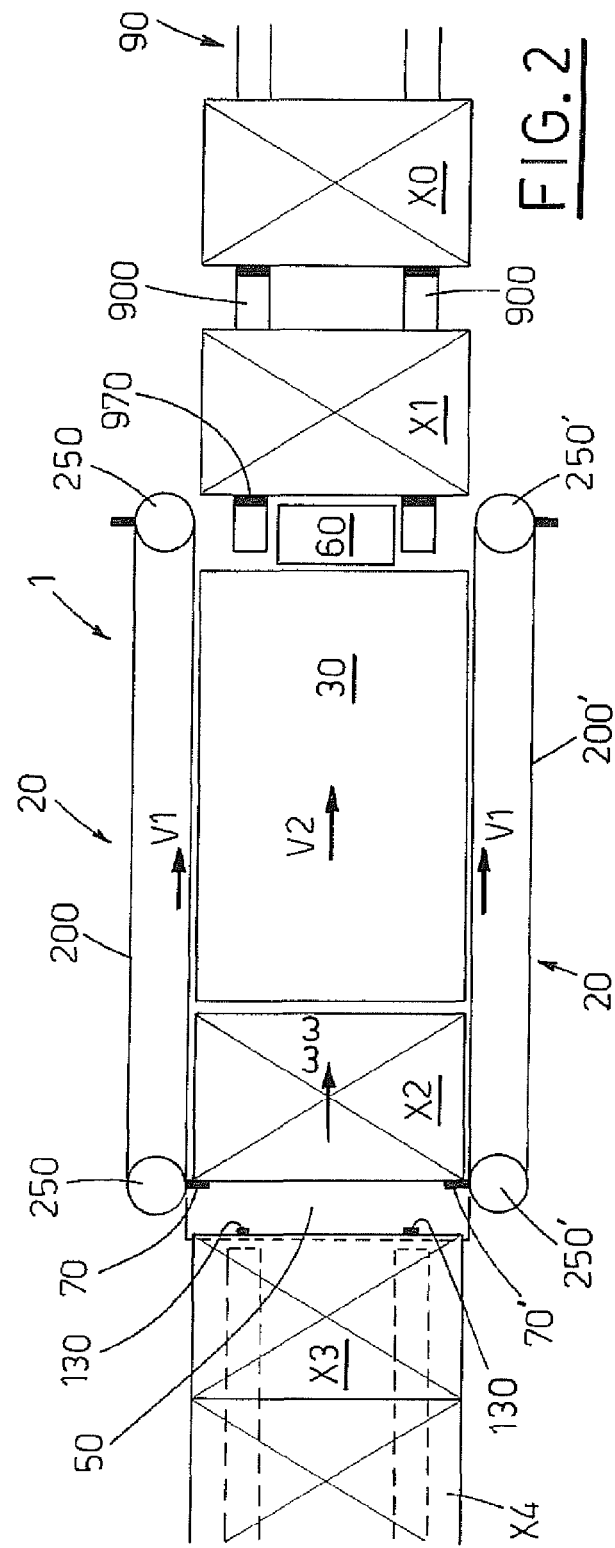

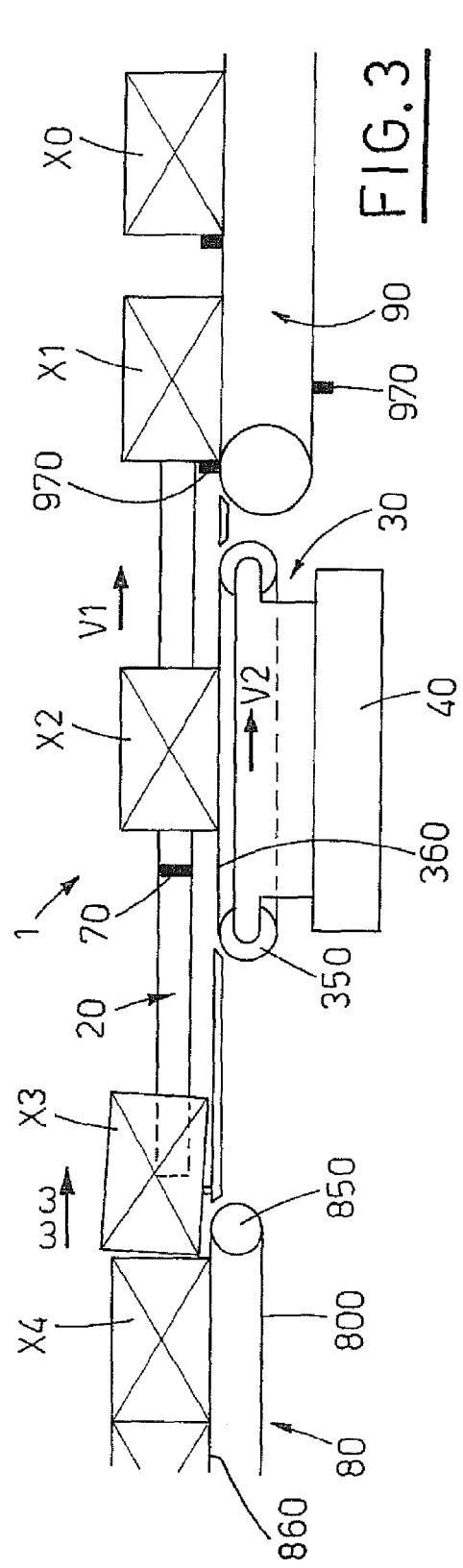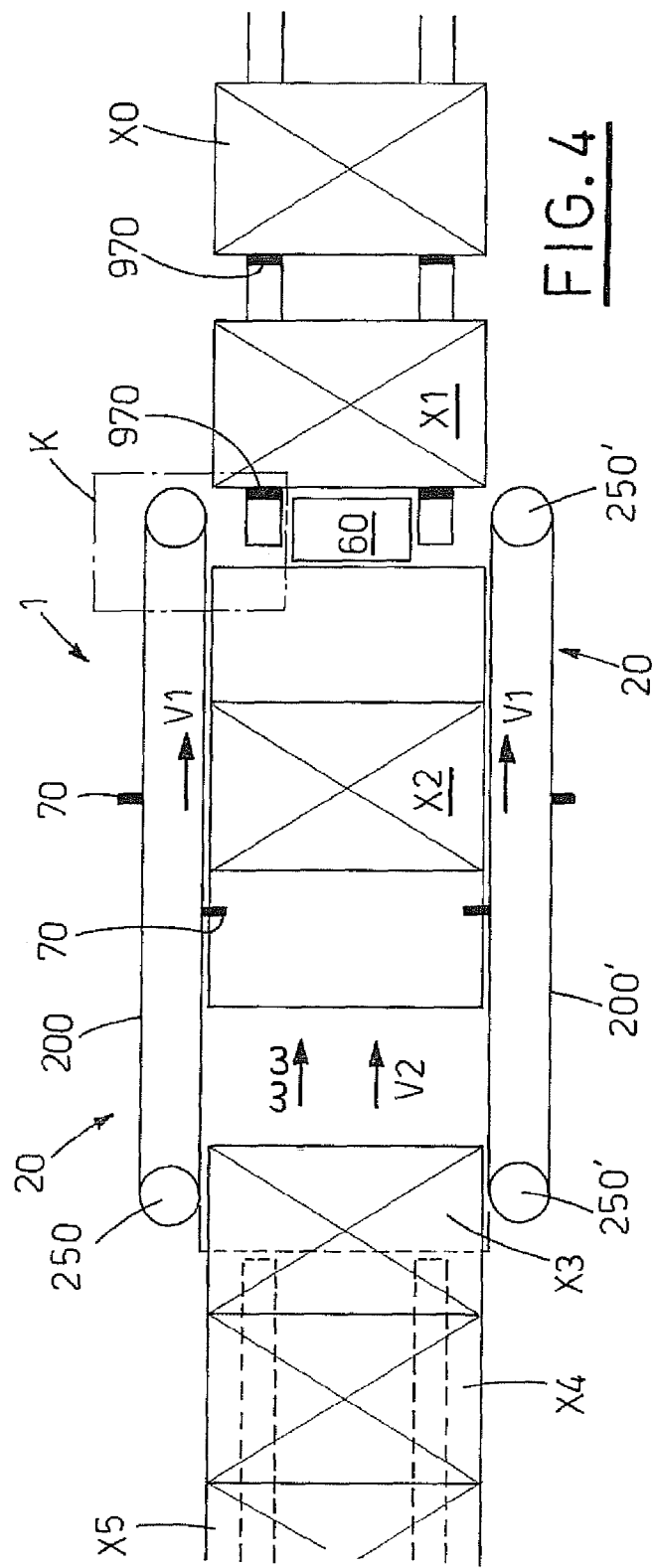

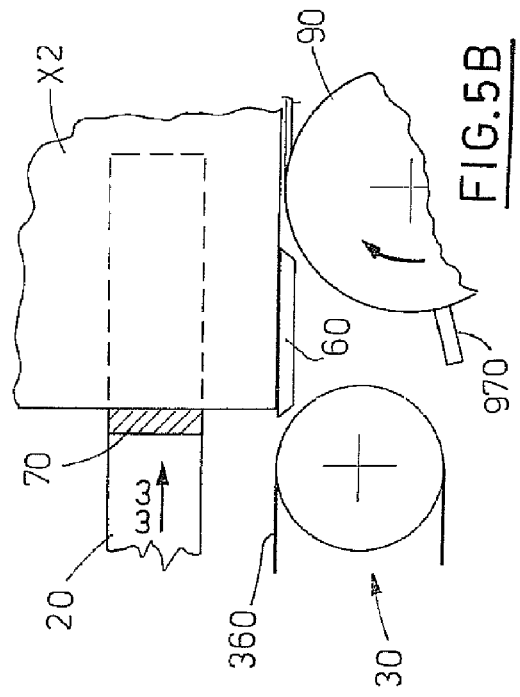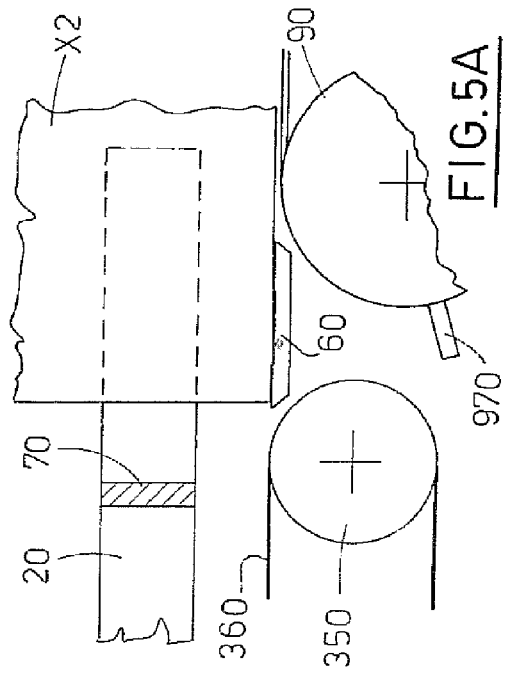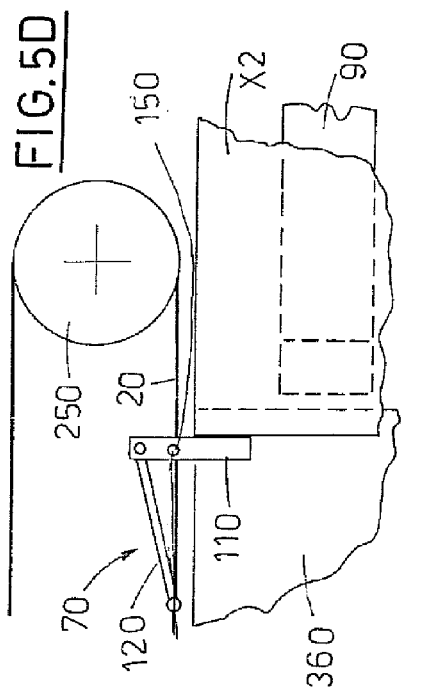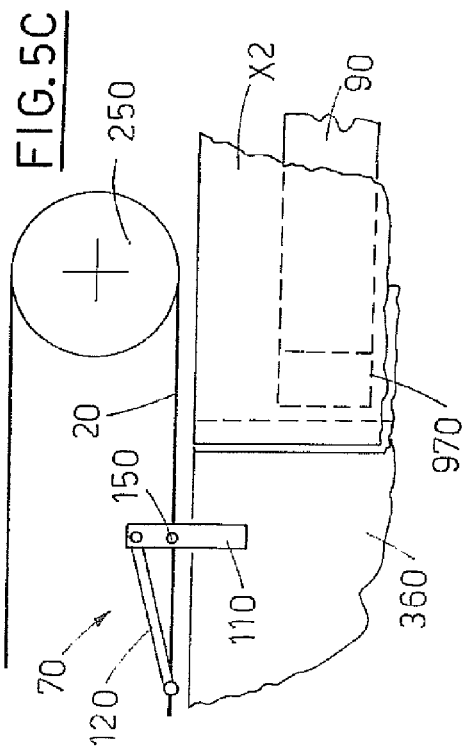

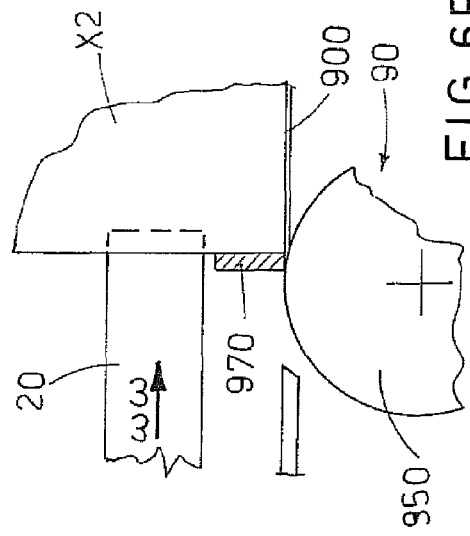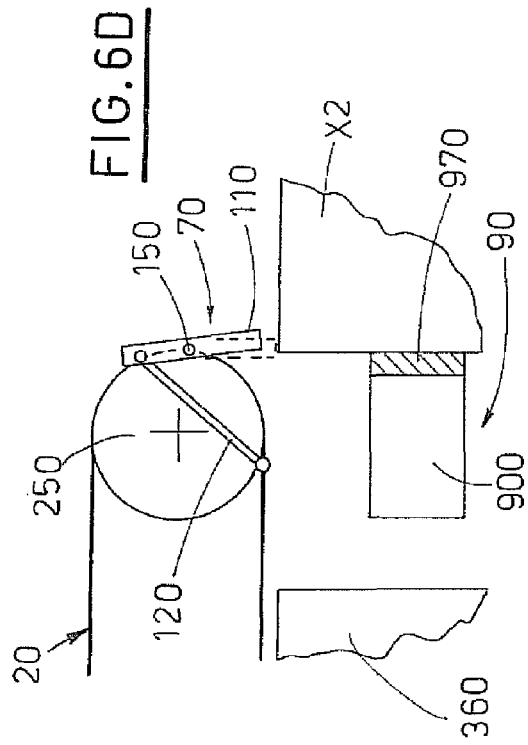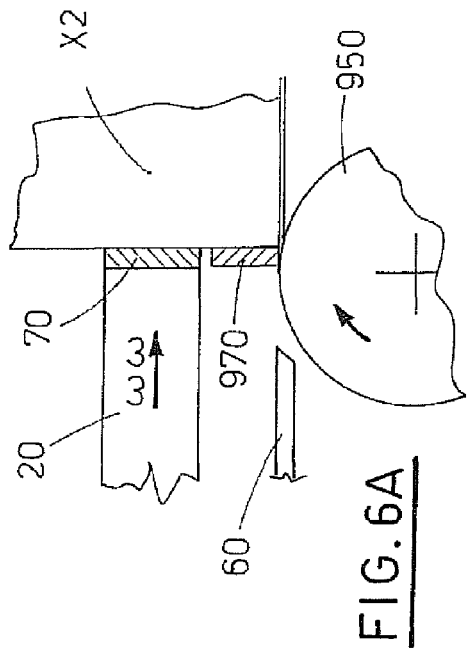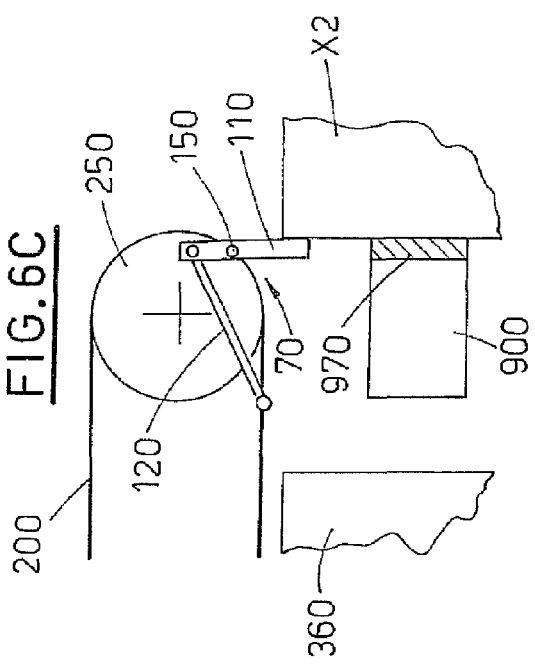

US 8,530,764 B2

DEVICE FOR WEIGHING ARTICLES MOVING CONTINUOUSLY ALONG A CONVEYING LINE

FIELD OF THE INVENTION

The invention relates to equipment for weighing articles, in particular articles transiting on automated conveyor lines comprising several conveyor organs. The lines can be situated, for example, in plants for production, packing, labeling or any other type.

A particularly important problem in these conveyor lines is how to introduce, downstream of a determined conveyor organ, a continuous weighing station for the articles, functionally integrated in the conveyor line downstream of the conveyor organ, which operates without there being any need to displace the articles from the line in which the weighing organs are not subject to interferences due to the conveyor organs present on the line downstream and/or upstream of the weighing station, in particular the vibrations to which these organs are subject.

DESCRIPTION OF THE PRIOR ART

Document EP1715307A2 intends to obviate this problem by proposing an article conveyor system which comprises a plurality of conveyor belts operating at a same velocity, and having a same direction and same conveyor advancement sense. This system comprises two main closed ring-wound conveyor belts wound about pulleys having vertical axes with the belts facing one another and being counter-rotating, in order to horizontally advance an article, and a weighing station situated below the main conveyor belts. The weighing station in turn comprises a scales, a series of three closed ring-wound secondary conveyor belts (inlet, central and outlet) wound on pulleys having horizontal axes, contiguous to one another and arranged horizontally on a same plane such as to advance the article horizontally in a same direction as the two main conveyor belts.

The secondary conveyor belts have, viewed overall, a dimension along the conveyor direction which is smaller than the dimension of the two main conveyor belts and are centrally arranged with respect thereto. At their longitudinal ends, the two internal branches of the main conveyor belts are distanced from one another such as to engage two opposite surfaces of an article, and to convey the article engaged in this way.

At the horizontal inlet conveyor belt, the two internal branches of the main conveyor belts diverge as they are diverted towards the respective external branches thereof. In this way the main conveyor belts disengage the article which, therefore, comes to rest on the horizontal inlet belt. The horizontal inlet belt transfers the article onto the central belt, associated to the scales. In turn, the central belt transfers the article to the horizontal outlet belt, at which the two internal branches of the main conveyor belts converge towards one another with the aim of newly engaging the article in transit on the horizontal outlet belt.

In this system, the scales determine the weight of the article while in transit on the central belt, i.e. when its weight is exerted on the central belt and thus on the scales associated thereto. The two second conveyor belts, inlet and outlet, are necessary for avoiding interference and vibrations during the weighing operation; furthermore, all the horizontal conveyor belts must operate in synchrony and the internal branches of the vertical belts must be moving at the same speed.

The system of EP1715307A2 is constituted by a multiplicity of motorized components (the various conveyor belts) and is thus rather complex.

BRIEF SUMMARY OF THE INVENTION

The aim of the present invention is to provide a device for efficiently and continuously weighing the articles in arrival from a conveyor organ which is a part of a conveyor line, the device being functionally integratable in the line in which the weighing is not influenced by the conveyor organs arranged upstream and downstream of the device.

A further aim of the invention consists in providing a device for efficiently and continuously weighing the articles in arrival from a conveyor organ which is a part of a conveyor line, which enables outlet of the already-weighed articles by means of the law of motion which regulates the movement of the articles along the conveyor organ upstream of the device. This is so that any further conveying subsequent to the weighing operating is independent of the velocity and/or the modes in which the articles are moved by the conveyor organ.

The proposed device comprises:

weighing means arranged downstream of the conveyor organ, which weighing means are able to detect a weight of articles transiting continuously thereon;

first conveyor means for abutting and engaging a side of an article in arrival from the conveyor organ, which first conveyor means transfer the article, once the article has been engaged, and draw the said article along an advancement direction towards the weighing means, the first conveyor means being activatable such as to convey the article, once engaged, towards the weighing means along the advancement direction at a first advancing velocity;

second conveyor means associated to the weighing means and arranged such as to be able to receive the article while the article is engaged to and drawn by the first conveyor means and the article is in advancement along the advancement direction towards the weighing means, the second conveyor means being activatable such as to be able to convey the article at a second advancement velocity which is greater than the first advancement velocity at which the article is advanced by the first conveyor means, such as to disengage the article from the action of the first conveyor means and to advance the article freely onto the weighing means in order to detect a relative weight thereof and convey the article downstream of the weighing means.

It is obvious that during functioning of the device, thanks to the greater velocity at which the second conveyor means operate with respect to the first conveyor means, it is possible to disengage the article from the first conveyor means in order to engage it and move it via the second conveyor means to the weighing means. In this way, only the weight of the article bears down on the weighing means. Further, the second conveyor means are arranged contiguously but not contactingly downstream of the conveyor organ, such that the weighing operations are not subjected to interference and vibrations due to the conveyor line which comprises the conveyor organ. Thus the measuring operations of the weight of the article are particularly accurate.

The first conveyor means of the device of the invention are configured such as to engage one side only of the articles. This enables the device to be more versatile. In a case in which the conveyor line is used to move articles having different dimensions (for example packing lines which can produce articles having different formats at different times), the first conveyor means of the device of the invention can advantageously comprise drawing elements, specially distanced from one another, for engaging a lateral surface of an article, through a wide range of formats.

It is therefore advantageous that a device of the invention in which the first conveyor means comprise a conveyor belt and at least a drawing element borne by the belt and projecting there-from such as to engage a lateral surface of the articles to be conveyed.

In the device of the invention, fixed planes are advantageously contiguously, preferably horizontally-arranged upstream and downstream of the second conveyor means, such as to limit the motorized components and further limit the vibrations.

For the purposes of the weighing operations, it is preferable that the first conveyor means be associated to guide means, arranged upstream of the second conveyor means, for conveying the article drawn by the second conveyor means centrally with respect to the weighing means.

In an advantageous embodiment of the proposed device, the second conveyor means comprise a closed ring-wound conveyor belt wound on pulleys having horizontal axes, activatable for receiving the articles from the first conveyor means and for drawing them towards the articles during the weighing operation. In this embodiment, the first conveyor means preferably comprise two conveyor belts, wound on pulleys with vertical axes, in which the internal branches are facing and moved in synchrony in the same direction as the branch of the upper branch of the conveyor belt of the second conveyor means, and provided with drawing elements which at the internal branches are correspondingly opposite.

Alternatively, the first conveyor means can be constituted by a single conveyor belt, wound on pulleys having horizontal axes, arranged above the belt of the second conveyor means with a parallel transport direction to that of the second conveyor means. In this case one or more drawing elements of the first conveyor means, at the lower branch thereof, engage a side of the article and draw it horizontally in order to transfer it onto the second conveyor means.

BRIEF DESCRIPTION OF THE DRAWINGS

The characteristics of the invention will emerge from the following description of a preferred embodiment of the device, in agreement with what is set out in the claims and with the aid of the accompanying figures of the drawings, in which:

FIGS. 1 and 3 are lateral views of an embodiment of the conveyor device of the invention at different functioning moments thereof;

FIGS. 2 and 4 are views from above of the conveyor device shown respectively in FIGS. 1 and 3;

FIGS. 5A-5B and 6A-6B are lateral views of detail K of the conveyor device of the invention in successive moments;

FIGS. 5C-5D and 6C-6D are views from above of the detail K respective of FIGS. 5A-5B and 6A-6B.

DESCRIPTION OF THE PREFERRED EMBODIMENTS

In the various FIGS. 1-6D, identical components have been denoted using the same numerical references in the following description of the various embodiments of the invention, and they will have similar characteristics unless otherwise indicated.

The figures illustrate an embodiment of the device 1 of the invention, functionally integrated downstream of a conveyor organ 80 internally of a conveyor line which conveys a series of articles X. These articles are singly denoted by $X_n$, in which n increases from downstream to upstream in the line, i.e. in reverse order with respect to the advancement direction WW of the articles X.

In the illustrated embodiment, with the aim of having a horizontal advancement direction of the articles X, the two conveyor belts 200, 200' of the first conveyor means 20 are wound on pulleys 250, 250' having vertical axes and the conveyor belt 300 of the second conveyor means 30 is wound on pulleys 350 having horizontal axes.

The device of FIGS. 1-4 advantageously comprises a fixed inlet plane 50, arranged between the conveyor organ 80 and the second conveyor means 30 and contiguous to both thereof, in order to receive the articles X to be weighed coming from the conveyor organ 80. The fixed inlet plane 50 is thus also upstream of the weighing means 40 associated to the second conveyor means 30. In this embodiment, the first conveyor means 20 have a development which is such as to be able to abut and engage a side of an article X to be weighed (denoted in FIGS. 1-2 by $X_2$) received from the fixed inlet plane 50, and to transfer the article X from the fixed inlet plane 50 to the second conveyor means 30.

The conveyor belt 300 of the second conveyor means 30 preferably has an upper branch 360 which is positioned at a height that is not greater than the fixed inlet plane 50, and more preferably is lower by 1 mm than the fixed inlet plane 50. This facilitates conveying of the articles X from the fixed inlet plane 50 to the upper branch 360 of the conveyor belt 300 of the second conveyor means 30 and limits the impacts on the weighing means 40 associated to the second conveyor means 30.

It is therefore advantageous to include, as shown in FIGS. 1-6D, a fixed outlet plane 60, arranged downstream of the second conveyor means 30 and contiguous thereto, in order to receive the weighed articles X coming from the second conveyor means 30. In this case the first conveyor means 20 exhibit a development which is such as to abut and engage a side of the article X, already weighed and transferred by the first conveyor means 20 onto the fixed outlet plane 60, and to transfer the article X from the fixed outlet plane 60, and to transfer the article X from the fixed outlet plane 60 downstream thereof, for example on a further conveyor device arranged downstream of the second conveyor means 30.

The device of the invention advantageously comprises third conveyor means 90 arranged contiguously downstream of the fixed outlet plane 60 in order to receive the articles X transferred by the first conveyor means 20 downstream of the fixed outlet plane 60 in order to continue the movement along the conveyor line towards specific work stations. In this way it is possible to further move the article X along the conveyor line, in which the device of the invention is integrated, independently of the velocity and the mode of advancement of the conveyor organ 80 downstream of the device 1.

In the preferred embodiment (FIGS. 1-4), the two conveyor belts 200, 200', are identical to one another and exhibit the relative internal branches opposite one another; the belts bear relative drawing elements 70, 70' which are opposite at the internal branches; it follows that the upstream side of the article $X_2$ is engaged by two corresponding drawing elements 70, 70' in order to transfer the article onto the second conveyor means 30.

The conveyor belts 200, 200' exhibit a development such that an article X to be weighed (denoted as $X_2$ in FIGS. 1-2), once received on the fixed inlet plane 50, can be abutted and engaged by a side of the drawing elements 70, 70'. Further the development must be such that the article X, once weighed and received on the fixed outlet plane 60 (as shown in FIGS.

5A and 5C), can be newly abutted by a side of the drawing elements 70, 70' (see FIGS. 5B and 5D) for subsequent transfer downstream of the fixed outlet plane 60.

In order to prevent interference on the weighing operations, there is preferably an interstice of at least one millimeter between the internal branches of the vertical conveyor belts 200, 200' and the surfaces of the article X facing them.

For the purposes of the weighing operations, it is preferable that guide means (not illustrated) are associated to the first conveyor means 20, which guide means are associated upstream of the second conveyor means 30 such as to convey the article X drawn by the second conveyor means 30 centrally with respect to the weighing means 40.

As illustrated in FIGS. 1-4, the fixed inlet plane 50 comprises an admittance device 130 of known type, preferably vertically mobile, as in FIGS. 1-8, for regulating intermittent access to the fixed inlet plane 50 of the articles X coming from the conveyor organ 80.

In FIGS. 1-4 the conveyor organ 80 upstream of the device 1, and thus of the inlet plane 50, is illustrated by way of example as a conveyor belt 800 wound on pulleys 850 having horizontal axes.

In FIGS. 1-2, the admittance device 130 is in a halted position, i.e. it projects from the fixed inlet plane 50 and abuts the article $X_3$ at the side of the article $X_3$ which is downstream with respect to the advancement direction. Consequently the article $X_3$ and the following articles $X_4$ are halted on the terminal part of the conveyor organ 80. The admittance device 130, being synchronizable with the first conveyor means 20, can enable infeed of an article $X_2$ onto the first fixed inlet plane 50 in phase relation with the movement of the first conveyor means 20. This enables the drawing elements 70, 70' to abut and engage the article $X_2$ at the side of the article $X_2$ which is upstream with respect to the advancement direction while the article $X_2$ is on the fixed inlet plane 50. Once engaged, the article $X_2$ is drawn by the first conveyor means 20 along the advancement direction WW towards the weighing means 40.

In FIGS. 3 and 4, the article $X_2$ has already been restingly received on the conveyor belt 300 of the second conveyor means 30 which convey it at an advancement velocity V2 which is greater than the velocity it was previously moved at on the first conveyor means 20 such that it was disengaged from the first conveyor means 20. The drawing elements 70, 70' do not abut the article $X_2$ again, which can therefore advance freely on the weighing means 40, which measure its weight.

The conveyor belt 300 will then transfer the article $X_2$, once weighed, downstream of the weighing means 40 on the fixed outlet plane 60.

As illustrated in FIGS. 5A and 5C, the article $X_2$ briefly rests on the fixed outlet plane 60 until the drawing elements 70, 70' intercept it, newly abutting it at its upstream side with respect to the advancement direction (see FIGS. 5B and 5D), then to transfer it downstream such that it can be engaged by third conveyor means 90 located downstream of the fixed outlet plane 60.

At this point the admittance device 130 will be switched into the consent position and will no longer project from the fixed inlet plane 50. Thus the article $X_3$, no longer halted by the admittance device 130, can be pushed by the convey or organ 80 which will transfer it onto the fixed inlet plane 50, as shown in FIGS. 3 and 4.

The third conveyor means 90 comprise a conveyor belt 900, wound on horizontal-axis pulleys, which bears a plurality of drawing teeth 970, equidistanced from one another. In FIGS. 6A, 6C the drawing elements 70, 70' have just transferred the article $X_2$ onto the upper branch of the conveyor belt 900; this is facilitated by the fact that the conveyor belt 900 is stationary.

In phase relation with the above, the belt 900 is activated, which causes the intercepting of a drawing tooth 970 against the upstream side of the article $X_2$. In phase relation, as illustrated in FIGS. 6B-6D, the drawing elements 70, 70', having reached the end of their run, disengage from the article $X_2$ and the third conveyor means 90 draw the article $X_2$ by one step in the advancement direction WW.

It is particularly advantageous to use articulated drawing elements 70, 70' such as the ones shown in FIGS. 9A-10D. The drawing elements 70, 70' comprise a tooth 110 and a rod 120, the tooth 110 being rotatably constrained to the conveyor belt 200, 200' such that a first end thereof projects from the conveyor belt 200, 200' in order to abut, engage and draw the articles X, and with the rod rotatably constrained by an end thereof to the conveyor belt 200, 200', in an upstream position to the tooth, considering the advancement direction of the conveyor belt 200, 200', and by another end thereof being rotatably constrained to the second end of the tooth 110 such that the tooth 110, in the winding tract of the conveyor belt 200, 200' about the pulleys 250, 250', is forced to undergo a rotation about the constraint point 150 thereof with the belt 200, 200' in order to reduce the size thereof, as illustrated in FIG. 6D.

This embodiment is particularly advantageous when it is necessary to convey the article X further on the line, for example with the third conveyor means 90 arranged downstream of the fixed outlet plane 60 and synchronizable with the first conveyor means 20. It is possible to set a phase relation between the first conveyor means 20 and the third conveyor means 90 such that the teeth 110 of the first conveyor means 20 and the drawing tooth 970 are vertically aligned as shown in FIGS. 10A and 10B and can thus abut and convey the article X downstream of the fixed outlet plane 60 with a law of motion that is independent of the velocity and mode with which the article X is conveyed upstream of the fixed inlet plane 50.

In the illustrated example it is hypothesized that the third conveyor means 90 will have a step motion; it is however possible that the third conveyor means 90 might also be continuously activated. In this case the articles X are transferred by the teeth 110 onto a fixed support, for example the fixed outlet plane 60, having an appropriate length, or onto a further fixed plane aligned thereof at the same height thereas, from which they are collected by a drawing tooth 970.

The above has been described purely by way of non-limiting example, and any variants of a practical-applicational nature are understood to fall within the ambit of protection of the invention as described herein above and as claimed in the following.

What is claimed:

1. A device for continuously weighing articles in arrival from a conveyor organ, the device comprising:

a weighing apparatus (40) arranged downstream of the conveyor organ (80), which weighing apparatus (40) detects a weight of articles transiting continuously thereon, a first conveyor (20) for abutting and engaging a side of an article (X) in arrival from the conveyor organ (80), which first conveyor (20) transfers the article (X), once the article (X) has been engaged, and draws the article (X) along an advancement direction (WW) towards the weighing apparatus (40), the first conveyor (20) being activatable such as to convey the article (X), once engaged, towards the weighing apparatus (40) along the advancement direction (WW) at a first advancement velocity (V1);

a second conveyor (30) associated to the weighing apparatus (40) and arranged to receive the article (X) while the article (X) is engaged to and drawn by the first conveyor (20) and the article (X) is in advancement along the advancement direction (WW) towards the weighing apparatus (40), the second conveyor (30) being activatable to convey the article (X) at a second advancement velocity (V2) which is greater than the first advancement velocity (V1) at which the article (X) is advanced by the first conveyor (20), to disengage the article (X) from the action of the first conveyor (20) and to advance the article (X) freely onto the weighing apparatus (40) in order to detect a relative weight thereof and convey the article (X) downstream of the weighing apparatus (40);

wherein the second conveyor (30) comprises a closed-ring conveyor belt (300) which is activatable to receive the articles (X) from the first conveyor (20) and to convey the articles (X) along the weighing apparatus (40); and, wherein the first conveyor (20) comprises at least one closed-ring conveyor belt (200) and at least one drawing element (70) borne by the conveyor belt (200) for engaging an article (X), the conveyor belt (200) having a transport direction which is parallel to a transport direction of the conveyor belt (300) of the second conveyor (30) and a development which is such that an article (X) to be weighed, received on a fixed inlet plane (50), can be abutted and engaged at a side thereof by the drawing element (70), the development further being such that the article (X), once weighed and received by a fixed outlet plane (60), can newly be abutted at a side thereof by the drawing element (70) for subsequent transfer downstream of the fixed outlet plane (60).

2. The device of claim 1, wherein the fixed outlet plane (60) is arranged downstream of the second conveyor (30) and contiguous thereto, in order to receive the articles (X) once weighed and in arrival from the second conveyor (30), and wherein the first conveyor (20) is configured to abut and to engage a side of the article (X), already weighed and transferred by the first conveyor (20) on the fixed outlet plane (60), and to transfer the article (X) from the fixed outlet plane (60) downstream thereof.

3. The device of claim 2, further comprising a third conveyor (90) arranged contiguously downstream of the fixed outlet plane (60) in order to receive the articles (X) transferred by the first conveyor (20) downstream of the fixed outlet plane (60).

4. The device of claim 1, wherein the fixed inlet plane (50) is arranged between the conveyor organ (80) and the second conveyor (30) and contiguous to both thereof, for receiving the articles (X) to be weighed in arrival from the conveyor organ (80), and wherein the first conveyor (20) is configured to abut and engage a side of an article (X) to be weighed, received from the fixed inlet plane (50) and to transfer the article (X) from the fixed inlet plane (50) to the second conveyor (30).

5. The device of claim 4, wherein the fixed inlet plane (50), arranged between the conveyor organ (80) and the second conveyor (30), comprises an admittance device for regulating an intermittent access to the fixed inlet plane (50) of the articles (X) coming from the conveyor organ (80).

6. The device of claim 1, wherein the first conveyor (20) comprise a further conveyor belt (200') and at least one further drawing element (70') borne by the further conveyor belt (200') and projecting therefrom, the further conveyor belt (200') being of a same extension as the conveyor belt (200), facing the conveyor belt (200), with the drawing elements (70, 70') of the two conveyor belts (200, 200') being positionable opposite one another in order together to abut, engage and draw the articles (X) upstream and downstream of the second conveyor (30).

7. The device of claim 1, wherein the conveyor belt (200, 200') of the first conveyor (20) is wound on pulleys (250, 250') having vertical axes and the conveyor belt (300) of the second conveyor (30) is wound on pulleys (350) having horizontal axes.

8. The device of claim 7, wherein the conveyor belt (300) of the second conveyor (30) has an upper branch (360) positioned at a height which is not greater than the fixed inlet plane (50) arranged between the conveyor organ (80) and the weighing apparatus (40).

9. The device of claim 1, further comprising a guide associated to the first conveyor (20) and arranged upstream of the second conveyor (30), for conveying the article (X) drawn by the second conveyor (30) centrally to the weighing apparatus (40).

* * * * *